(12) United States Patent
Roach et al.

(10) Patent No.: US 8,893,248 B2
(45) Date of Patent: Nov. 18, 2014

(54) METHODS, SYSTEMS, AND COMPUTER READABLE MEDIA FOR MEDIA SESSION POLICY COMPLIANCE AUDITING AND ENFORCEMENT USING A MEDIA RELAY AND SESSION INITIATION PROTOCOL (SIP) SIGNALING

(75) Inventors: Adam B. Roach, Dallas, TX (US); Ben A Campbell, Irving, TX (US); Robert J Sparks, Plano, TX (US); Ajay P. Deo, Lewisville, TX (US)

(73) Assignee: Tekelec, Inc., Morrisville, NC (US)

( * ) Notice: Subject to any disclaimer, the term of this patent is extended or adjusted under 35 U.S.C. 154(b) by 827 days.

(21) Appl. No.: 12/637,563

(22) Filed: Dec. 14, 2009

(65) Prior Publication Data

US 2010/0154047 A1 Jun. 17, 2010

Related U.S. Application Data

(60) Provisional application No. 61/122,258, filed on Dec. 12, 2008.

(51) Int. Cl.
*H04L 9/32* (2006.01)
*H04L 29/06* (2006.01)

(52) U.S. Cl.
CPC ............... *H04L 65/10* (2013.01); *H04L 63/20* (2013.01)
USPC .......................................................... 726/9

(58) Field of Classification Search
USPC .............................. 709/227–229; 726/2, 9, 22
See application file for complete search history.

(56) References Cited

U.S. PATENT DOCUMENTS

| 8,010,783 B1* | 8/2011 | Cahill ........................... 713/155 |
| 2002/0111996 A1* | 8/2002 | Jones et al. .................... 709/203 |
| 2002/0120749 A1* | 8/2002 | Widegren et al. ............. 709/227 |
| 2004/0125760 A1* | 7/2004 | Newberg et al. .............. 370/312 |
| 2007/0019545 A1* | 1/2007 | Alt et al. ........................ 370/230 |
| 2009/0089439 A1* | 4/2009 | Benco et al. .................. 709/228 |

FOREIGN PATENT DOCUMENTS

WO WO 2006100500 A2 * 9/2006 .............. H04L 29/06

OTHER PUBLICATIONS

"Billing," Mobile in a Minute™, http://www.mobilein.com/billing.htm, (copyright 2001-2004).
Hilt, et al., "A Framework for Session Initiation Protocol (SIP) Session Policies," SIPPING Work Group draft-ietf-sip-session-policy-framework-06 (Sep. 13, 2009).

(Continued)

*Primary Examiner* — David Le
(74) *Attorney, Agent, or Firm* — Jenkins, Wilson, Taylor & Hunt, P.A.

(57) ABSTRACT

Methods, systems, and computer readable media for media session policy compliance auditing and enforcement using a media relay and session initiation protocol (SIP) signaling are provided. One method includes at a SIP policy server, receiving SIP signaling from a user agent client to obtain a policy for media session and, in response, generating at least one media session correlation token. At least a portion of the SIP policy server is implemented in hardware. The media session correlation token and the media policy are communicated to the user agent client and to a media relay. Identification information for the media relay is also communicated to the user agent client. At least a portion of the media relay is implemented in hardware. At the media relay, the media session correlation token is received and used to correlate and store usage information for the media session and to monitor compliance with the media policy.

23 Claims, 5 Drawing Sheets

(56) References Cited

OTHER PUBLICATIONS

Rosenberg, et al., "Traversal Using Relays for NAT (TURN): Relay Extensions to Session Traversal Utilities for NAT (STUN)," BEHAVE WG draft-ietf-behave-turn-16 (Jul. 3, 2009).

Hilt, et al., "A User Agent Profile Data Set for Media Policy," SIPPING Working Group draft-ietf-sipping-media-policy-dataset-07 (Mar. 7, 2009).

Hilt, et al., "A Framework for Session Initiation Protocol (SIP) Session Policies," SIPPING Working Group draft-ietf-sip-session-policy-framework-04 (Aug. 22, 2008).

Hilt, et al., "A Session Intiation Protocol (SIP) Session Policies," SIPPING Working Group draft-ietf-sipping-policy-package-05 (Jul. 12, 2008).

Hilt, et al., "A User Agent Profile Data Set for Media Policy," SIPPING Working Group draftj-ietf-sipping-media-policy-dataset-06 (Jul. 12, 2008).

Froment et al., "Addressing Record-Route Issues in the Session Initiation Protocol (SIP)," Network Working Group, draft-ietf-sip-record-route-fix-05 (Aug. 14, 2009).

Jennings et al., "Managing Client Initiated Connections in the Session Initiation Protocol (SIP)," Network Working Group, draft-ietf-sip-outbound-16 (Oct. 29, 2008).

Rosenberg et al., "Traversal Using Relays around NAT (TURN): Relay Extensions to Session Traversal Utilities for NAT (STUN),"Internet-Draft, draft-ietf-behave-turn-10 (Sep. 29, 2008).

Rosenberg et al., Traversal Using Relays Around NAT (TURN): Relay Extensions to Session Traversal Utilities for NAT (STUN), Internet Draft, draft-ietf-behave-turn-09 (Jul. 12, 2008).

Petrie et al., "A Framework for Session Initiation Protocol User Agent Profile Delivery," SIPPING Internet-Draft, draft-ietf-sipping-config-framework-15 (Feb. 13, 2008).

Willis et al., "Session Initiation Protocol (SIP) Extension Header Field for Service Route Discovery During Registration," Network Working Group, RFC 3608 (Oct. 2003).

Rosenberg et al., "An Extension to the Session Initiation Protocol (SIP) for Symmetric Response Routing," Network Working Group, RFC 3581 (Aug. 2003).

Willis et al., "Session Initiation Protocol (SIP) Extension Header Field," Network Working Group, RFC 3327 (Dec. 2002).

Schulzrinne, "Dynamic Host Configuration Protocol (DHCP-for-IPv4) Option for Session Initiation Protocol (SIP) Servers," Network Working Group, RFC 3361 (Aug. 2002).

Rosenberg et al. "Session Initiation Protocol (SIP): Locating SIP Servers," Network Working Group, RFC 3263 (Jun. 2002).

Hardie, "Distributing Anthoritative Name Servers via Shared Unicast Addresses," Network Working Group, RFC 3258 (Apr. 2002).

\* cited by examiner

METHODS, SYSTEMS, AND COMPUTER READABLE MEDIA FOR MEDIA SESSION POLICY COMPLIANCE AUDITING AND ENFORCEMENT USING A MEDIA RELAY AND SESSION INITIATION PROTOCOL (SIP) SIGNALING

PRIORITY CLAIM

This application claims the benefit of U.S. Provisional Patent Application Ser. No. 61/122,258, filed Dec. 12, 2008; the disclosure of which is incorporated herein by reference in its entirety.

TECHNICAL FIELD

The subject matter described herein relates to media session policy enforcement. More particularly, the subject matter described herein includes methods, systems, and computer readable media for media session policy auditing and enforcement using a media relay and session initiation protocol (SIP) signaling.

BACKGROUND

In traditional telecommunications networks, network usage auditing and policing are relatively easy to implement, because telecommunications signaling and media sessions each traverse a designated set of nodes controlled by the network operator. As used herein, the term "media session" refers to an association between end users that carries end user communications. The term "signaling session" refers to messages exchanged between end user and/or network devices to establish, tear down, or maintain a media session. Network usage auditing and policing can be achieved by monitoring the media and/or the signaling session at the nodes through which the messages travel. Auditing and fraud prevention in traditional telecommunications networks is further facilitated by the fact that such networks use time division multiplexed (TDM) channels to carry media and signaling sessions, where the bandwidth allocated to each channel is fixed, limiting the ability of users to exceed allocated bandwidth. For auditing in traditional telecommunications networks, signaling and media usage records can be collected directly from the end office switches to determine whether any irregularities exist.

In IP networks, such as voice over IP networks that use SIP for signaling, there is no guarantee that signaling or media sessions will traverse a predictable set of nodes managed by the network operator. In one example of media session fraud, end users can collude to send signaling that indicates to the network that a media session has been terminated but then continue media communications after sending the termination signaling. As a result, network resources may be used without authorization and charging for the call will not correspond to usage time indicated by the signaling. In other examples of media session fraud, end users can collude to use more bandwidth or a different codec than indicated in a signaling session used to establish the media session.

To alleviate some of these problems associated with usage auditing and fraud prevention in IP-based telecommunications networks, a SIP policy framework has been defined where a user agent client can communicate with the policy server to determine the media policy for a media session. However, the policy framework proposed in current Internet drafts does not specify a mechanism for enforcing the media portion of the policy in light of the above described problem of lack of path predictability for media streams. In other words, the policy framework specifies how the user agent client obtains a media policy from a policy server, but does not specify a mechanism for enforcing a media policy in light of the fact that real time transport protocol (RTP) media streams between user agent clients may traverse any set of nodes that can forward IP traffic. Because there is no guarantee that media traffic will traverse a given node or set of nodes, there is no centralized node or set of nodes to perform policy enforcement.

Media relays have been developed to allow user agent clients to communicate with each other through network address translators and firewalls. However, such media relays are typically contacted directly by the user agent clients and there is currently no communication between the media relays and SIP proxy or policy nodes.

Session border controllers provide a single location for signaling and policy enforcement. However, session border controllers are monolithic and are usually only located at boundaries between networks managed by different service providers. Accordingly, in light of these difficulties, there exists a long felt need for methods, systems, and computer readable media for media session policy auditing and enforcement using a media relay and session initiation protocol (SIP) signaling.

SUMMARY

Methods, systems, and computer readable media for media session policy compliance auditing and enforcement using a media relay and session initiation protocol (SIP) signaling are provided. One method includes, at a SIP policy server, receiving SIP signaling from a user agent client to obtain a policy for media session and, in response, generating at least one media session correlation token. The SIP policy server may include one or more processors. The media session correlation token and the media policy are communicated to the user agent client and to a media relay including one or more processors. Identification information for the media relay is also communicated to the user agent client. At the media relay, the media session correlation token is received and used to correlate and store usage information for the media session and to monitor compliance with the media policy.

The subject matter described herein for providing for media session policy compliance auditing and enforcement using a media relay and SIP signaling can be implemented using a computer readable medium having stored thereon executable instructions that when executed by the processor of a computer control the computer to perform steps. Exemplary computer readable media suitable for implementing the subject matter described herein include non-transitory computer readable media, such as chip and disk memory devices accessible by a processor, programmable logic devices, and application specific integrated circuits. In addition, a computer readable medium that implements the subject matter described herein may be located on a single device or computing platform or may be distributed across multiple devices or computing platforms.

The subject matter described herein for providing for media session policy compliance auditing and enforcement using a media relay and SIP signaling can be implemented on or tied to a particular machine or machines. For example, a SIP policy server is an example of a particular machine that may perform at least a portion of the functionality described herein for media session policy auditing and enforcement. Similarly, a media relay is another example of a particular machine that may be used to provide for media session policy auditing and enforcement. Both SIP policy servers and media relays are examples of suitably programmed computers that can be used to implement media session policy auditing and enforcement as described herein. In addition, it is understood that the media relay and that at the SIP policy server may each include one or more processors that have access to a computer readable medium storing the computer executable instructions for implementing the subject matter described herein.

BRIEF DESCRIPTION OF THE DRAWINGS

Preferred embodiments of the subject matter described herein will now be described with reference to the accompanying drawings of which.

DETAILED DESCRIPTION

Figure 1:
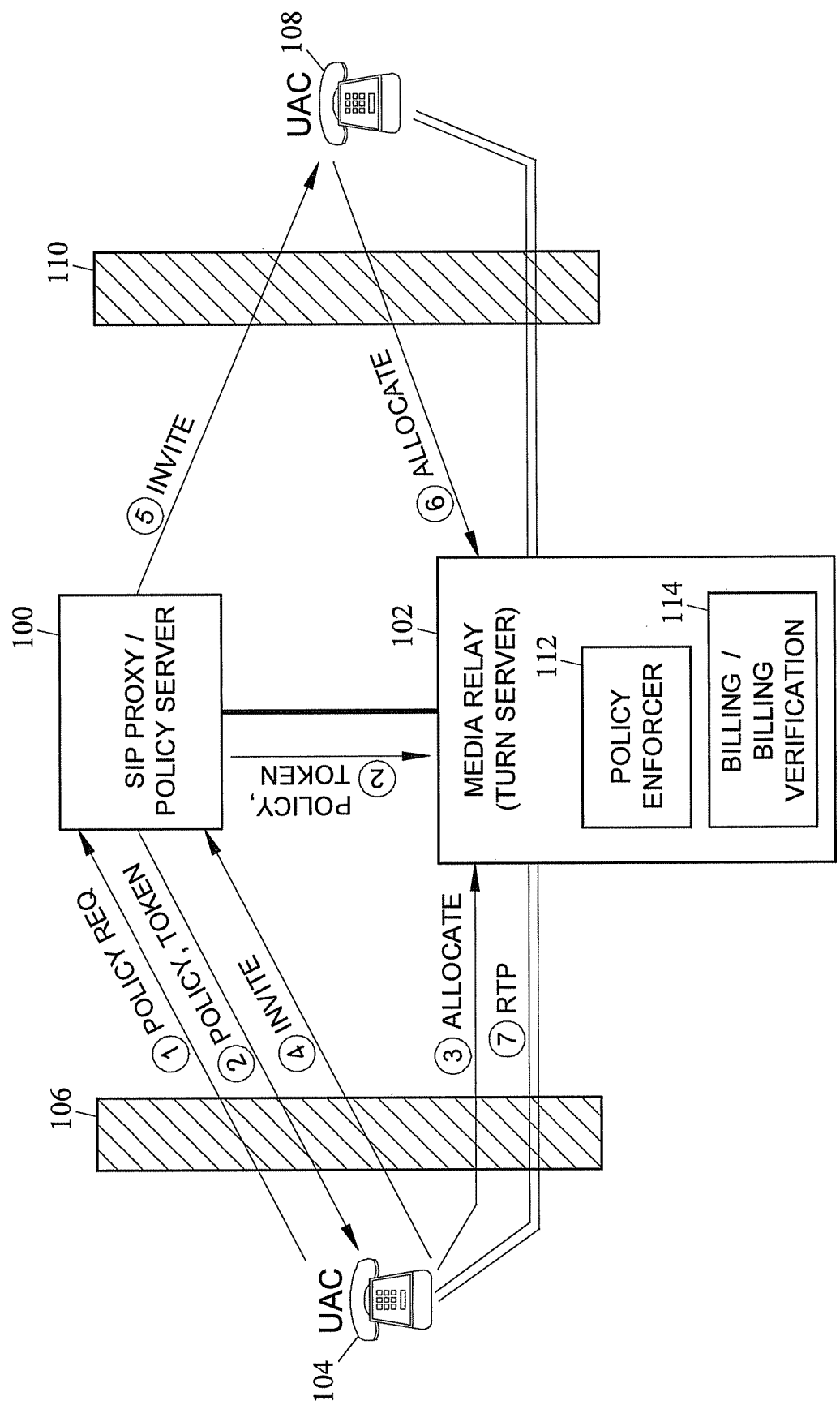
FIG. 1 is a block diagram of a system for providing for media session policy compliance auditing and enforcement using a media relay and SIP signaling according to an embodiment of the subject matter described herein.

The subject matter described herein includes methods, systems, and computer readable media for providing for media session policy compliance auditing and enforcement using a media relay and SIP signaling. FIG. 1 is a block diagram of an exemplary system of providing for media session policy compliance auditing and enforcement using a media relay and SIP signaling according to an embodiment of the subject matter described herein. Referring to FIG. 1, the system includes a SIP proxy/policy server 100 that performs SIP signaling functions and a media relay 102 that performs media relay functions. SIP proxy/policy server 100 may be a single node that performs both SIP proxy and policy functions or may be separate nodes that perform the SIP proxy and policy functions.

SIP proxy/policy server 100 may implement the SIP policy framework described in one or more of the following IETF Internet drafts or any of their successor documents:
  http://tools.ietf.org/html/draft-ietf-sip-session-policy-framework-06,
  http://tools.ietf.org/html/draft-ietf-sipping-policy-package-05, and
  http://tools.ietf.org/html/draft-ietf-sipping-media-policy-dataset-07,
the disclosure of each of which is incorporated herein by reference in its entirety. According to the SIP policy framework, SIP proxy/policy server 100 may respond to policy requests from user agent clients with media policies. In addition to providing media policies according to the policy framework, SIP proxy/policy server 100 may generate media session correlation tokens that are used to identify the media session in media relay 102. The media session correlation tokens generated by SIP proxy/policy server 100 may be communicated to user agent client (UAC) 104 located behind NAT/firewall 106. The same media session correlation token or a media session correlation token that is correlateable with the token communicated to UAC 104 may be communicated to media relay 102 along with the media policy.

Media relay 102 may be a computing platform that relays media packets between user agent clients. In one implementation, media relay 102 may be a TURN server, the function of which is specified in IETF Internet draft, http://tools.ietf.org/html/draft-ietf-behave-turn-16 (and its successor documents), the disclosure of which is incorporated herein by reference in its entirety. As described above, media relays have traditionally been used to connect user agent clients located on opposite sides of NATs and firewalls. According to the present subject matter, media relay 102 may be used for media session policy compliance auditing and enforcement.

The simplified call flow illustrated in FIG. 1 will now be described. Referring to the call flow, in line 1, user agent client 104 requests a media session policy from SIP proxy/policy server 100. In line 2, SIP proxy/policy server 100 communicates the policy and the corresponding media session correlation token to UAC 104. Also in line 2, the media session correlation token and the media policy are communicated to media relay 102. In line 3, UAC 104 contacts media relay 102 to establish the calling party network leg of the media session. In line 4, UAC 104 sends a SIP INVITE message to SIP proxy/policy server 100 to invite the called party to the media session. In line 5, SIP proxy/policy server 100 invites called UAC 108 located behind NAT/firewall 110 to join the media session by sending a SIP INVITE message to UAC 108. In line 6, called UAC 108 establishes the called party network leg of the media session using media relay 102. In line 7, a two-way RTP media session is established between UACs 104 and 108 via media relay 102.

Media relay 102 uses the session correlation token to monitor, correlate, and store usage information for the media session. In one implementation, a policy enforcer component 112, which may be integrated within or separate from media relay 102, uses the media session correlation token to enforce media session policies in real-time. For example, policy enforcer 112 may instruct media relay 102 to block a media session that does not conform to its media session policy by identifying the media session to be blocked using the assigned media session correlation token. In response to a determination that a media session identified by a particular token is to be blocked, media relay 102 may free RTP resources reserved for the media session corresponding to the media session correlation token so that the resources can be used for other media sessions.

In one exemplary implementation, the association between the media session, the media session policy, and media session correlation token is communicated to media relay 102 by a combination of messages 2 and 3 illustrated in FIG. 1. For example, in line 2, media relay 102 receives the policy and the media session correlation token from SIP proxy/policy server 100. In line 3, media relay 102 receives the request from user agent client 104 to allocate the media session. In one implementation, the allocation request may include the media session correlation token so that media relay 102 can correlate the media session that it creates with the media policy received from SIP proxy/policy server 100. Once the association between the media session, the media session policy, and the media session correlation token is established in media relay 102, media relay 102 uses the association to perform the above described policy enforcement and auditing functions.

In another policy enforcement example, policy enforcer component 112 may implement lawful intercept forwarding of media packets to a third party, for example, for CALEA or other law enforcement purposes. For example, policy enforcer component 112 may use the media session correlation token to identify a monitored RTP media session. Media relay 102 may forward the RTP packets and/or the signaling packets associated with the monitored RTP media session to a law enforcement entity. Such forwarding may include copying the RTP and/or signaling packets transparently to the end users and forwarding the copied packets to the law enforcement entity.

In an auditing example, a charging/charging verification component 114 may use the media session correlation token to audit media records generated by media relay 102. For example, charging/charging verification component 114 may compare media records generated by media relay 102 for a call to one or more policies to determine whether bandwidth usage polices, codec policies, or other policies associated with the media session correlation token communicated to media relay 102 along with the policy in line 3 of FIG. 1 were exceeded during the call. Charging/charging verification component 114 may also generate bills based on the media records generated by media relay 102 for the call. Like policy enforcer component 112, charging/charging verification component 112 may be integrated within or separate from media relay 102.

Figure 2:
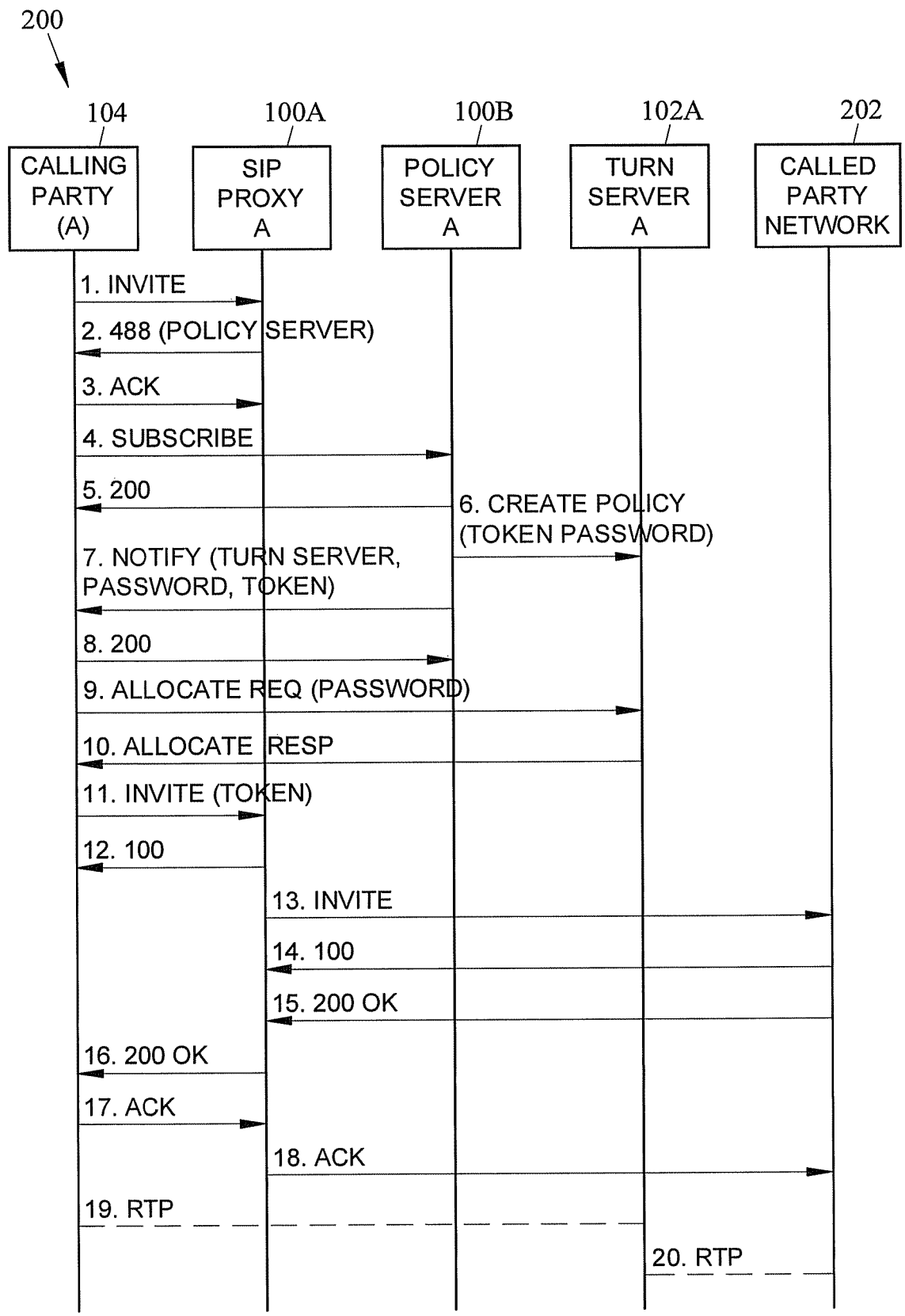
FIG. 2 is a call flow diagram illustrating exemplary SIP signaling for media session policy compliance auditing and enforcement using a media relay and SIP signaling according to an embodiment of the subject matter described herein.

FIG. 2 is a more detailed call flow diagram corresponding to the calling party side of the call illustrated in FIG. 1. The nodes illustrated in FIG. 2 are assumed to be part of a calling party network 200. Referring to FIG. 2, in lines 1-3 of the call flow diagram, calling party UAC 104 requests that a new media session be established, and, in response, SIP proxy 100A sends the identification of a policy server that contains policies for the media session. In lines 4, 5, 7, and 8, UAC 104 communicates with policy server 100B to obtain the media policy and the media session correlation token. In line 7, the media session correlation token is communicated to UAC 104 as the TURN server user ID. Similarly, in line 6, the media session correlation token is communicated to TURN server 102. Communicating the media session correlation token to UAC 104 as the TURN server user ID forces UAC 104 to use the media session correlation token to authenticate itself to TURN server 102. As a result, TURN server 102 can match media communications for the session for which the TURN server user ID is valid with the media session correlation token and the corresponding policy. However, the subject matter described herein is not limited to communicating the media session correlation token to the UAC as the TURN server user ID. In an alternate implementation, the media session correlation token may be communicated to UAC 104 using a parameter other than the TURN server user ID, and a correlation between the media session correlation token and the TURN server user ID may be communicated by SIP proxy 100A to TURN server 102.

In lines 9 and 10, calling party UAC 104 authenticates with TURN server 102A and requests allocation of the calling party network leg of the media session. In lines 11 and 12, calling party UAC 104 requests establishment of a media session using the media session correlation token generated by policy server 100B. In lines 13-18, SIP proxy 100A uses SIP signaling with called party network 202 and calling party UAC 104 to establish the called party network leg of the session through TURN server 102. In lines 19 and 20, the RTP media session is established through TURN server 102A.

Figure 3:
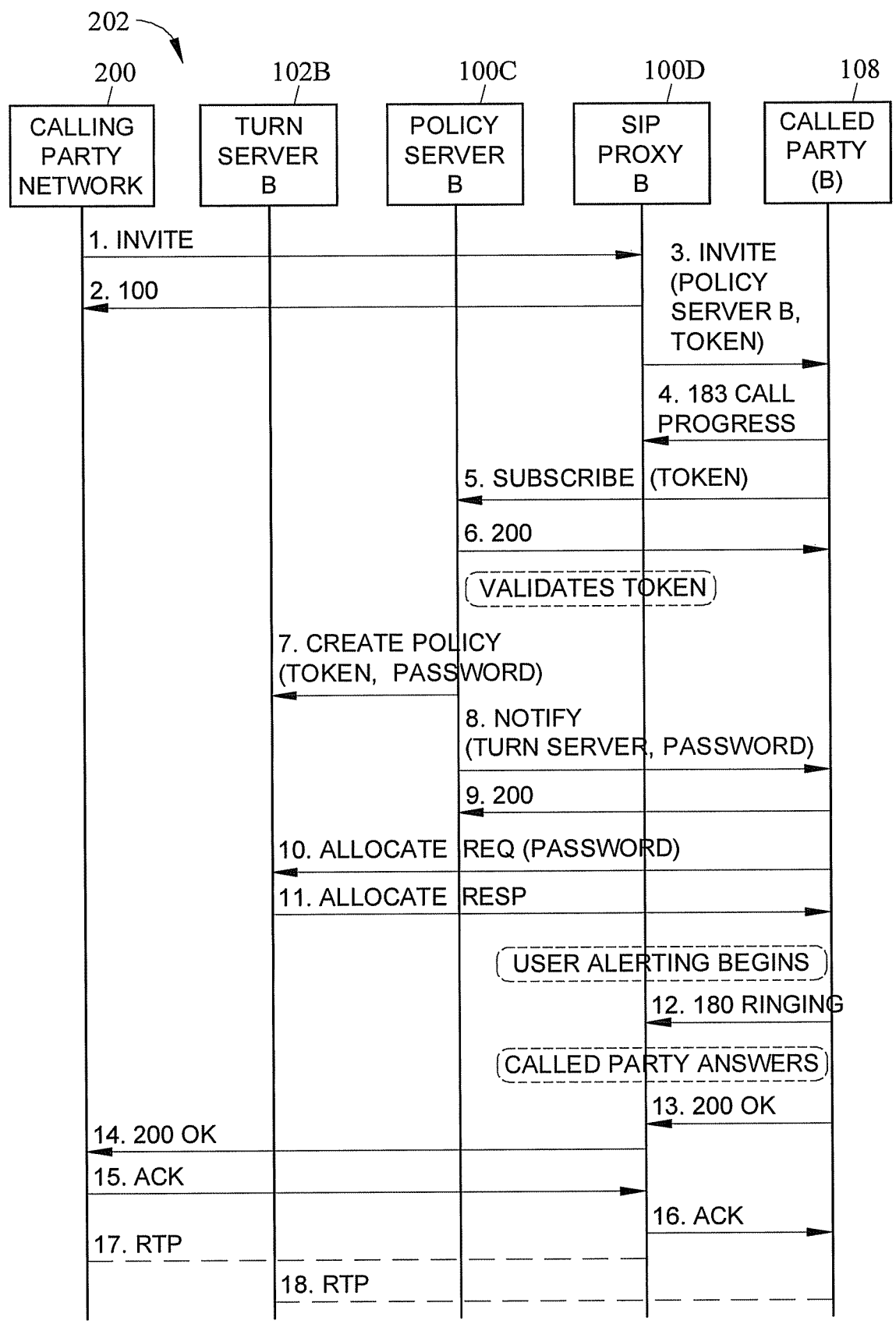
FIG. 3 is a call flow diagram illustrating exemplary call setup signaling for a called party for media session policy compliance auditing and enforcement using a media relay and SIP signaling according to an embodiment of the subject matter described herein.

FIG. 3 is a call flow diagram illustrating signaling that occurs within called party network 202 to establish its portion of the media session. It should be noted that in the call flow illustrated in FIG. 3, separate TURN servers, policy servers, and SIP proxies are implemented in the called party's network to implement media session policy enforcement and usage auditing in the called party network. It is understood that these nodes may perform similar functions to their corresponding components in the calling party's network, as described with regard to FIGS. 1 and 2. However, the media policy implemented in called party network 202 may be different from that implemented in calling party network 200, especially in the case when calling party network 200 and called party network 202 are under different administrative domains.

Referring to FIG. 3, in lines 1 and 2 of the call flow diagram, called party network 202 forwards and acknowledges the INVITE message received from calling party network 200 in line 13 of FIG. 2. In lines 3 and 4, SIP proxy 100D sends a SIP INVITE message to called party UAC 108 and receives a SIP 183 call in progress message from called party UAC 108. The INVITE message sent to called party UAC 108 in line 3 may include an identification of the policy server that contains media policies to be enforced in called party network 202 for the media session and the media session correlation token generated for the media session by called party network 202. In lines 5 and 6, called party UAC 108 requests a media policy from policy server 100C. Policy server 100C creates a policy and associates the policy with the media session correlation token generated for the session in called party network 202. In line 7, policy server 100C communicates the media session policy, the token and a password to TURN server 102B. In lines 8 and 9, policy server 100C communicates the TURN server user ID and the password to called party UAC 108. In lines 10 and 11, called party UAC 108 communicates with TURN server 102B to authenticate itself and establish the called party leg of the media connection. In line 12, called party UAC sends a 180 ringing message to SIP proxy 100D. In line 13, called party UAC 108 sends a 200 ok message to SIP proxy 100D. In lines 14-16, SIP proxy 100D completes the signaling with calling party network 200 to establish an RTP media stream. In lines 17 and 18, the RTP media stream is established.

Once the called and calling party media session legs are established via TURN servers 102A and 102B, media session policies implemented by calling party network 200 and called party network 202 may be enforced by their respective TURN servers. It is understood that the called and calling party networks may be under separate administrative domains and may therefore desire to implement different media policies. Exemplary media session policies that may be enforced by TURN servers 102A and 102B include bandwidth policies, codec policies, time of day policies, etc. In addition, TURN servers 102A and 102B may include charging/charging verification applications that use the media session correlation tokens to audit media sessions without performing corresponding enforcement actions in real-time.

Figure 4:
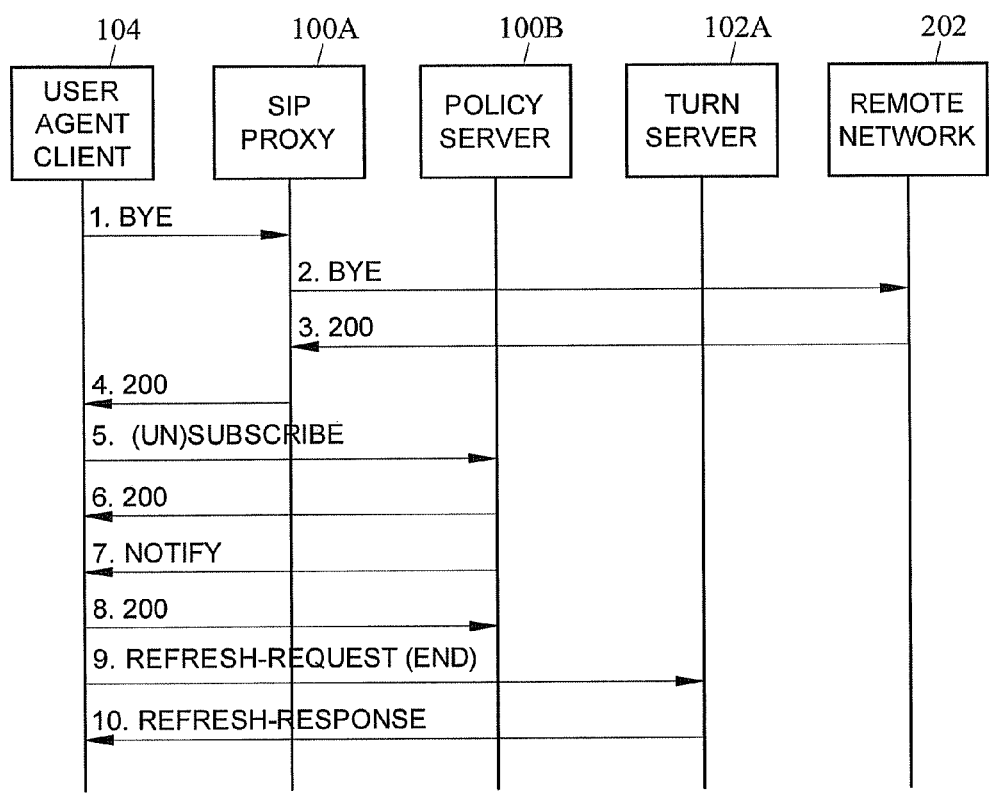
FIG. 4 is a call flow diagram illustrating exemplary call teardown in a normal call without fraud according to an embodiment of the subject matter described herein.

FIG. 4 is a call flow diagram illustrating exemplary call teardown signaling that may be monitored by SIP proxies and policy servers and used as a basis for media session policy enforcement according to an embodiment of the subject matter described herein. Referring to FIG. 4, in line 1, user agent client 104 sends a SIP bye message to SIP proxy 100A. SIP proxy 100A forwards the bye message and receives an acknowledgement from remote network 202. In line 4, the acknowledgement is communicated to user agent client 104.

In lines 5 and 6, user agent 104 unsubscribes from policy server 100B. In lines 7 and 8, policy server 100B informs UAC 104 that the subscription has been withdrawn. In lines 9 and 10, user agent client 104 terminates the media session with TURN server 102A. In the example illustrated in FIG. 4, because user agent client 104 terminates the media session with TURN server 102A, fraud is not present.

Figure 5:
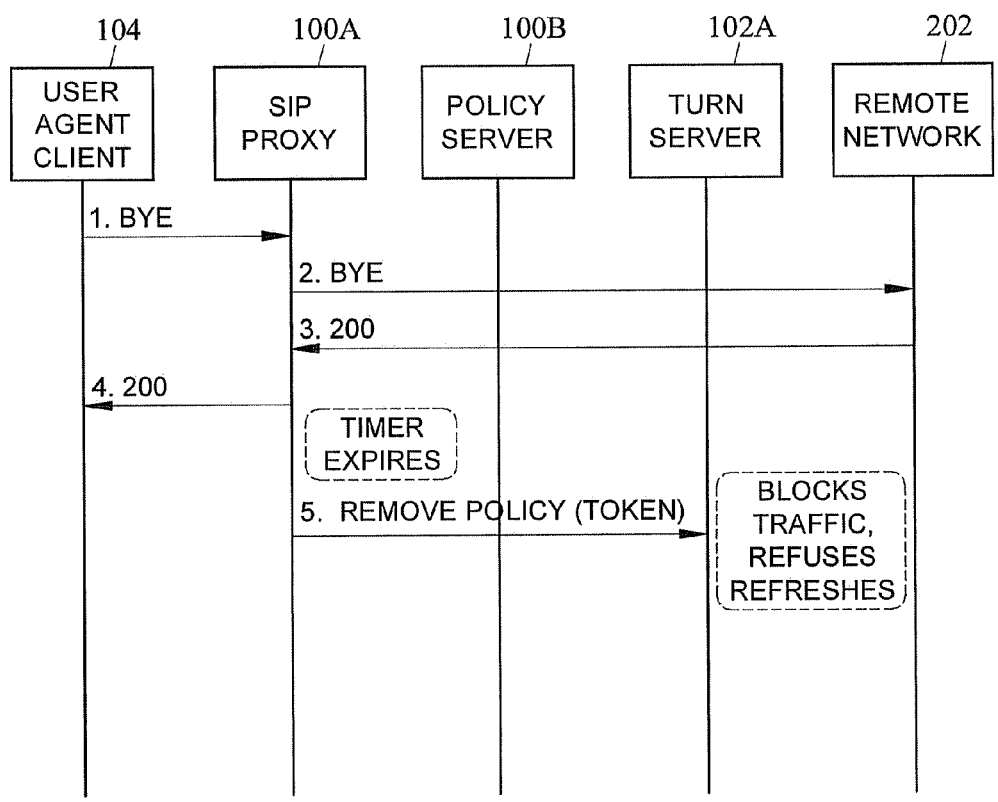
FIG. 5 is a call flow diagram illustrating exemplary fraud prevention performed by a system for media session policy compliance auditing and enforcement using a media relay and SIP signaling according to an embodiment of the subject matter described herein.

Without fraud prevention, user agent client 104 could omit the signaling in line 9 of the message flow diagram of FIG. 4 and keep the media session open. However, SIP proxy 100A and TURN server 102A can implement measures to prevent this from occurring. FIG. 5 illustrates one example of a measure to prevent such fraud. Referring to FIG. 5, in lines 1-4, user agent client 104 sends the bye message to remote network 200 and receives the acknowledgement. In response to the bye message, SIP proxy 100A may start a timer. Upon expiration of the timer, SIP proxy 100A may send a message to TURN server 102A to remove the media session specified by the media correlation token. In response to receiving the message to remove the media session, TURN server 102A may block traffic and free resources associated with the media session. Accordingly, the example illustrated in FIG. 5 prevents user agent clients from colluding to continue a media session after signaling for ending the media session has occurred.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing for media session policy compliance auditing and enforcement using a TURN server and session initiation protocol (SIP) signaling, the method comprising:
    at a SIP policy server including one or more processors, receiving SIP signaling from a user agent client (UAC) to determine a media policy for a media session, and, in response:
        generating at least one media session correlation token;
        communicating the at least one media session correlation token and the media policy from the SIP policy server to the UAC in a manner that forces the UAC to authenticate itself with a TURN server using the at least one media session correlation token and to the TURN server, which is separate from the SIP policy server, at least a portion of the media relay being implemented in hardware, wherein the TURN server relays media packets between the UAC and a second UAC; and
        communicating identification information for the TURN server to the user agent client; and
    at the TURN server, receiving the at least one media session correlation token from the SIP policy server and using the at least one token to correlate and store usage information for the media session and to monitor compliance with the media policy, wherein correlating and storing usage information includes associating the usage information with the media session and storing the correlated usage information.

2. The method of claim 1 comprising, at the media relay, using the media session correlation token and the media policy to provide for real-time enforcement of the media policy.

3. The method of claim 2 wherein providing for real-time enforcement of the media policy includes freeing resources associated with the media session and blocking packets associated with the media session after termination signaling associated with the media session has been exchanged.

4. The method of claim 2 wherein providing for real-time enforcement of the media policy includes establishing a lawful intercept tap point at the TURN server.

5. The method of claim 1 comprising using the at least one media session correlation token to extract the usage information from the media relay and audit the media session.

6. The method of claim 5 wherein auditing the media session includes determining whether media session parameters conform to the media policy.

7. The method of claim 5 comprising generating charging information based on the auditing.

8. The method of claim 1 wherein the at least one media session correlation token comprises a first media session correlation token that is communicated to the UAC and a second media session correlation token that is communicated to the TURN server.

9. The method of claim 1 wherein the at least one media session correlation token comprises a single media session correlation token that is communicated to the UAC and to the media relay.

10. The method of claim 9 wherein the single media session correlation token comprises the user ID used by the UAC to authenticate itself to the media relay.

11. The method of claim 1 comprising communicating the media session correlation token to a called user agent client to correlate signaling from the called user agent client with the media session.

12. A system for providing for media session policy compliance auditing and enforcement using a TURN server and session initiation protocol (SIP) signaling, the system comprising:
    a SIP policy server including one or more processors for receiving SIP signaling from a user agent client (UAC) to determine a media policy for the media session, and, in response:
        for generating at least one media session correlation token;
        for communicating the at least one media session correlation token and the media policy from the SIP policy server to the UAC in a manner that forces the UAC to authenticate itself with a TURN server using the at least one media session correlation token and to the TURN server, which is separate from the SIP policy server, at least a portion of the TURN server being implemented in hardware, wherein the TURN server relays media packets between the UAC and a second UAC; and
        for communicating identification information for the TURN server to the user agent client; and
    the TURN server for receiving the at least one media session correlation token from the SIP policy server and using the at least one token to correlate and store usage information for the media session and to monitor compliance with the media policy, wherein correlating and storing usage information includes associating the usage information with the media session and storing the correlated usage information.

13. The system of claim 12 wherein the media relay uses the media session correlation token and the media policy to provide for real-time enforcement of the media policy.

14. The system of claim 13 wherein providing for real-time enforcement of the media policy includes freeing resources associated with the media session and blocking packets associated with the media session after termination signaling associated with the media session has been exchanged.

15. The system of claim 13 wherein providing for real-time enforcement of the media policy includes establishing a lawful intercept tap point at the TURN server.

16. The system of claim 12 wherein the TURN server is configured to use the at least one media session correlation token to extract the usage information from the TURN server and audit the media session.

17. The system of claim 16 wherein auditing the media session includes determining whether media session parameters conform to the media policy.

18. The system of claim 6 comprising generating charging information based on the auditing.

19. The system of claim 12 wherein the at least one media session correlation token comprises a first media session correlation token that is communicated to the UAC and a second media session correlation token that is communicated to the TURN server.

20. The system of claim 12 wherein the at least one media session correlation token comprises a single media session correlation token that is communicated to the UAC and to the TURN server.

21. The system of claim 20 wherein the single media session correlation token comprises the user ID used by the UAC to authenticate itself to the TURN server.

22. The system of claim 12 wherein the SIP proxy/policy server is configured to communicate the media session correlation token to a called user agent client to correlate signaling from the called user agent client with the media session.

23. A non-transitory computer readable medium having stored thereon computer executable instructions that when executed by the processor of a computer controls the computer to perform steps comprising:
at a SIP policy server, receiving SIP signaling from a user agent client (UAC) to determine a media policy for a media session, and, in response:
generating at least one media session correlation token;
communicating the at least one media session correlation token and the media policy from the SIP policy server to the UAC in a manner that forces the UAC to authenticate itself with a TURN server using the at least one media session correlation token and to a the TURN server, which is separate from the SIP policy server, wherein the media relay relays media packets between the UAC and a second UAC; and
communicating identification information for the TURN server to the user agent client; and
at the TURN server, receiving the at least one media session correlation token from the SIP policy server and using the at least one token to correlate and store usage information for the media session and to monitor compliance with the media policy, wherein correlating and storing usage information includes associating the usage information with the media session and storing the correlated usage information.

\* \* \* \* \*